H. A. ZABEL.
CRANKING ATTACHMENT FOR AUTOMOBILE ENGINES.
APPLICATION FILED AUG. 6, 1919.

1,324,711.

Patented Dec. 9, 1919.

Inventor
Hellmuth A. Zabel

By H. S. Hill
Attorney

UNITED STATES PATENT OFFICE.

HELLMUTH ANTON ZABEL, OF POY SIPPI, WISCONSIN.

CRANKING ATTACHMENT FOR AUTOMOBILE-ENGINES.

1,324,711.     Specification of Letters Patent.     Patented Dec. 9, 1919.

Application filed August 6, 1919. Serial No. 315,643.

*To all whom it may concern:*

Be it known that I, HELLMUTH ANTON ZABEL, a citizen of the United States, residing at Poy Sippi, in the county of Waushara, State of Wisconsin, have invented a new and useful Cranking Attachment for Automobile-Engines; and I do hereby declare the following to be a full, clear, and exact description of the invention, such as will enable others skilled in the art to which it appertains to make and use the same.

The present invention relates to an attachment to be applied to the ordinary hand cranking devices for automobiles.

The object of this invention is to provide a simply constructed and easily applied device which may be positioned upon the cranking mechanism now found on such types of machines as are known as Fords, the invention having for its purpose to hold the crank handle in either a raised or lowered position and from rattling or vibrating incident to the operation of the engine and the motion of the vehicle.

Another object of the invention is to provide a crank handle retainer of this character which will automatically grasp and hold the handle when either in a raised or lowered position so that should the operator without starting the engine release the handle and allow it to fall into its lower position, the handle will be automatically held from vibrating in such position.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Corresponding and like parts are referred to in the following description and indicated in all the views of the drawings by the same reference characters.

Figure 1:
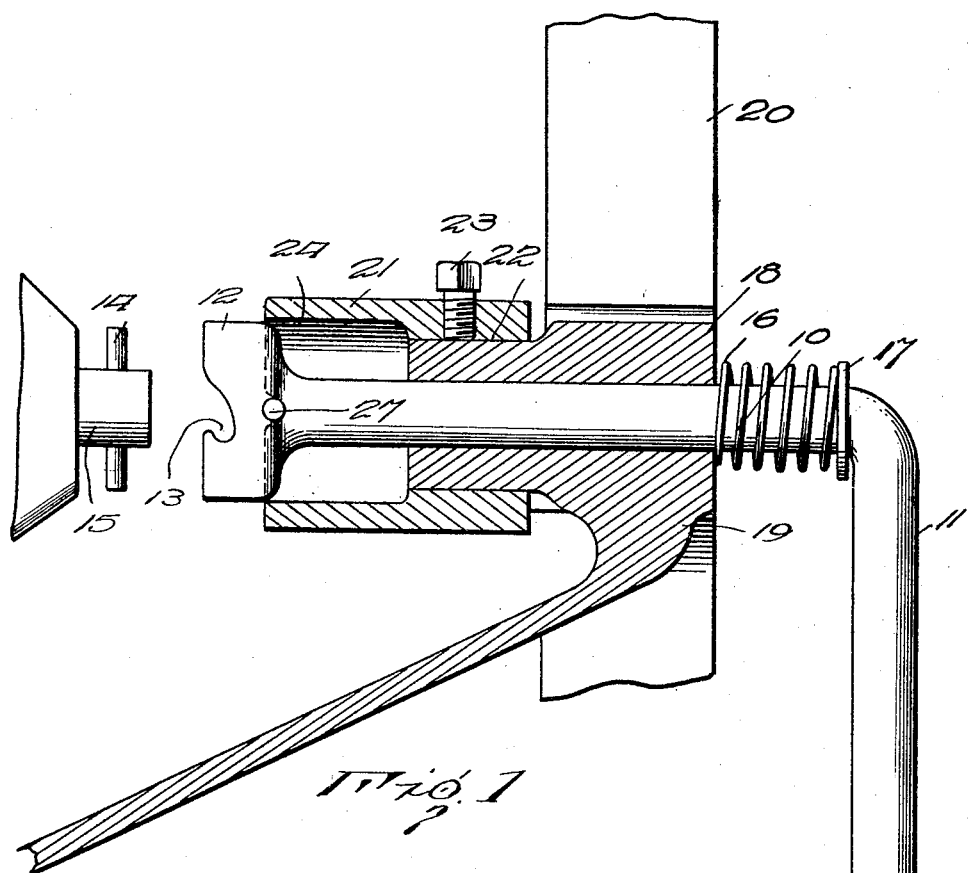
Figure 1 is a side elevation, partly in section of the end cranking mechanism applied to adjacent parts of an automobile, and showing the device of this invention applied thereto.
Figures 2, 3:
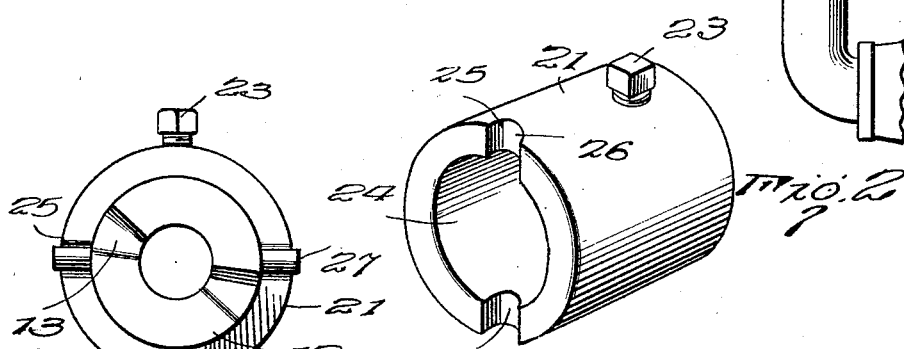
Fig. 2 is a perspective view of the device of this invention.
Fig. 3 is an inner end view of the same.

Referring to the drawing, 10 designates a crank shaft having the usual crank handle 11 and provided upon its rear end with the usual socket 12 having notches 13 to receive the ends of the usual cross pin 14 projecting beyond opposite sides of the crank shaft 15. The ordinary spring 16 surrounds the outer end of the crank shaft 10 bearing at one end against a collar 17 fixed on the crank shaft and at its other end against a bushing 18 which is seated in the forward end of the crank case bottom 19 beneath the radiator 20.

The above well-known parts are brought into operation by moving the crank shaft 10 rearwardly through the bushing 18 and against the tension of the spring 16 to engage the socket 12 with the cross pin 14.

This invention provides means for holding the crank handle 11 in either a raised or lowered position to maintain the crank handle from vibrating which causes undue wear upon the bushing 18 as well as causing an unnecessary noise. The invention comprises a holder 21 which may be in the form of a cylindrical casting provided at its outer end, or the end near the radiator 20, with a socket 22 adapted to receive the inner end of the bushing 18, the holder or cylindrical member 21 being fixed to the bushing by a set screw 23 which is threaded through one side of the holder and adapted to bind against the adjacent side of the bushing. The holder 21 has an axial opening therethrough adapted to receive the crank shaft 10 and to admit the longitudinal sliding of the crank shaft through the holder.

The inner end of the holder 21 is also provided with a recess or socket 24 of sufficient size to receive the adjacent end of the socket 12 of the crank shaft, and the holder is provided in opposite sides with notches 25 having outwardly flaring walls 26 forming cam surfaces over which the opposite ends of a relatively long transverse pin 27 are adapted to slide for entering the notches 25. The spring 16 is utilized, in performing its ordinary function of releasing the socket 12 from the crank shaft 15 of the engine, to retract the socket 12 into the recess 24 of the holder and to move the ends of the pin 27 into the notches 25. The notches 25 and the pin 27 are so relatively located that the pin approximately registers with the notches when the crank handle 11 is in either a raised or a lowered position, so that the handle 11 may be locked in either of such positions. The pin 12, which is relatively long, takes the place of the usual coupling pin now employed for holding the socket 12 on the shaft 10. The holder 21 may be readily slipped over the inner end of the shaft 10 and onto the bushing 18 after the socket 12 has been removed, and the holder may be detached in a light easy manner. The set screw 23 holds the cylindrical member 21 in adjusted position, and provides a means for quickly securing and releasing the holder upon the frame of the automobile.

It is of course understood that various changes and modifications may be made in the details of the construction of the holder to meet requirements of the application of the holder to different types of hand cranking mechanisms, without departing from the spirit of the invention, such modifications and changes being restricted only by the scope of the following claim.

Having thus described the invention, what I claim as new and desire to secure by Letters Patent, is:—

An automobile starting mechanism, comprising a bearing member, a hand crank having a retaining pin supported in said bearing, and a hollow cylindrical member having a pair of alined notches adjustably supported upon said bearing, said hand crank being adapted to partially enter said hollow member with its retaining pin entering said notches to hold said hand crank in a predetermined position.

In testimony whereof I have signed my name to this specification in the presence of two subscribing witnesses.

HELLMUTH ANTON ZABEL.

Witnesses:
 HERMAN PIETZ,
 CARL ZABEL.